Nov. 24, 1970   W. A. RHEINFELDER   3,543,222
METHOD AND APPARATUS FOR COUPLING TO A CO-AXIAL CABLE
Filed Feb. 24, 1969   2 Sheets-Sheet 1
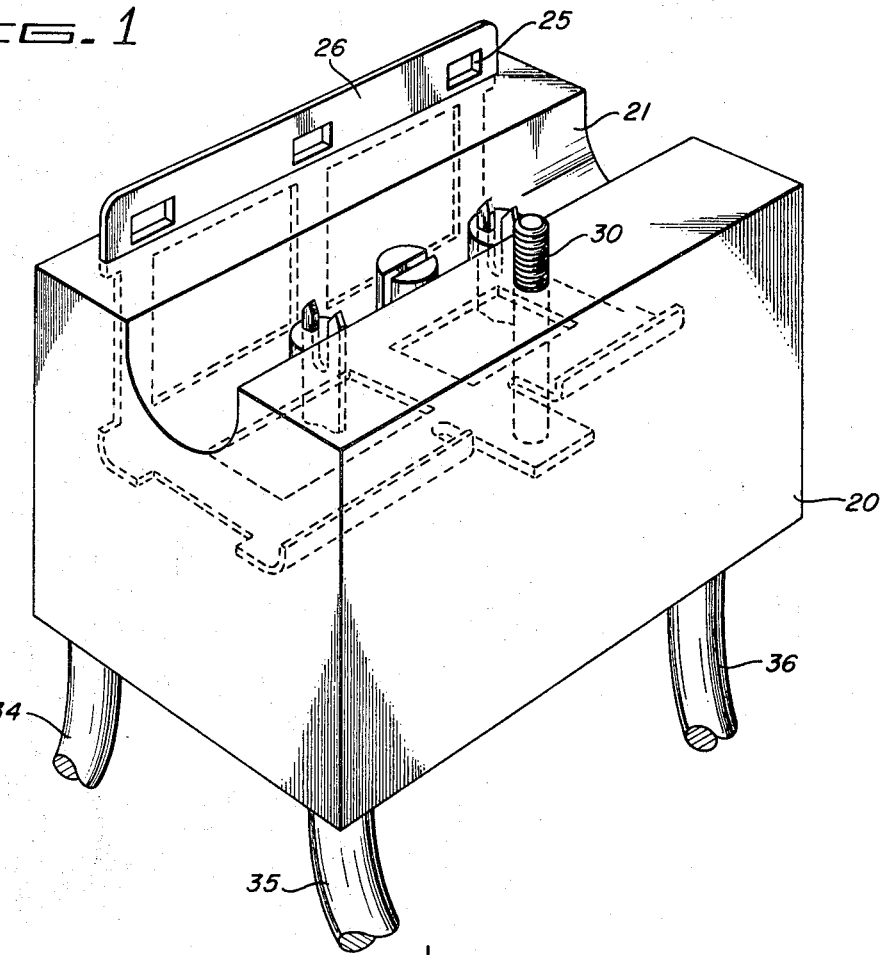
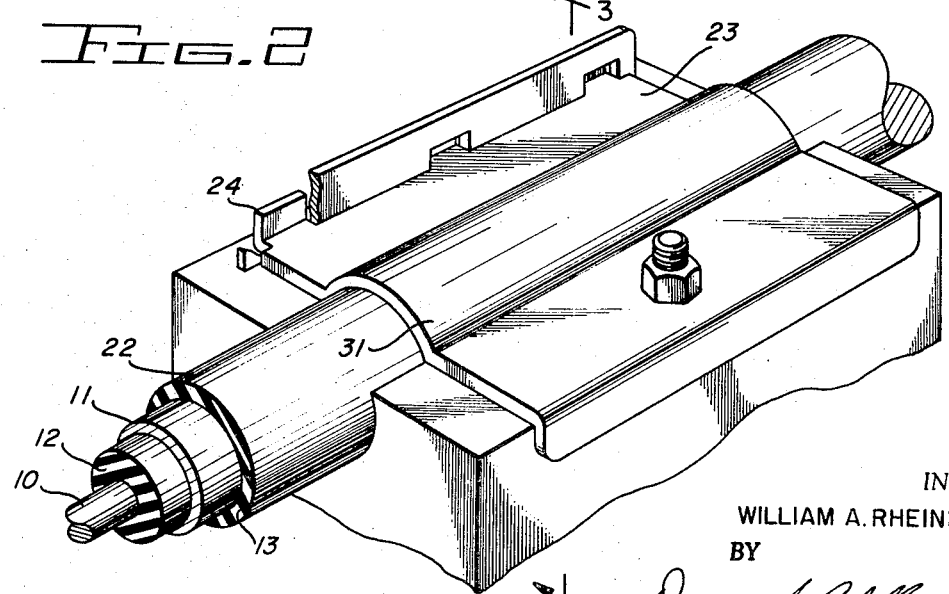
INVENTOR.
WILLIAM A. RHEINFELDER
BY
Drummond, Cahill & Phillips
ATTORNEYS

INVENTOR.
WILLIAM A. RHEINFELDER

United States Patent Office 3,543,222
Patented Nov. 24, 1970

3,543,222
METHOD AND APPARATUS FOR COUPLING TO A CO-AXIAL CABLE
William A. Rheinfelder, Phoenix, Ariz., assignor to RJ Communication Products, Inc., a corporation of Delaware
Filed Feb. 24, 1969, Ser. No. 801,700
Int. Cl. H01r 5/12, 9/08, 17/12
U.S. Cl. 339—99                             10 Claims

ABSTRACT OF THE DISCLOSURE

A method for connecting to a co-axial cable wherein a plurality of holes are cut into the cable, one of which severs the inner conductor thereof. Other holes spaced on either side of the first hole penetrate the outer conductor but do not contact the inner conductor. Electrical contact is made through the outer holes by extending forked electrical contacts through the insulation separating the inner and outer conductors into gripping contact with the inner conductor. Grounding contact is provided to the outer conductor by forcing a cylinder of insulating material into the center hole and providing a spring-like fork member within the cylinder that extends outwardly therefrom to forcibly engage the outer conductor of the co-axial cable.

---

The present invention pertains to a method and apparatus for connecting to a co-axial cable, and more specifically, to a method and apparatus for tapping a co-axial television cable to provide a convenient means for connecting a directional coupler or amplifier thereto.

The necessity for providing convenient connectors for coupling to a co-axial television cable has been more acute with the advent of cable television (CATV). Typically, a CATV system will utilize extensive antenna and receiving equipment for receiving and amplifying a television signal. The receiving equipment is connected to a main trunk which may also be provided with suitable repeaters to maintain signal strength on the cable. The main trunk line will usually service a number of feeder lines; the latter will ordinarily be installed in a neighborhood and be positioned along the telephone poles or perhaps underground in the case of undergood utility service. The feeder lines are typically co-axial cables having a single solid inner conductor of copper and a single solid tubular aluminum outer conductor with dielectric material between the two to maintain positioning. A plastic sheath will normally surround the cable.

The feeder lines are tapped at convenient locations to provide the appropriate television signal to individual dwellings through smaller co-axial cables called house drops. A house drop cable is usually formed of a single solid inner copper wire surrounded by a semi-flexible plastic material which supports a braided copper outer conductor. The entire cable is covered with an insulating and weatherproofing sheath. The tap on the feeder line is normally installed by semi-skilled personnel unacquainted with the complexities of high frequency signal transmission and the problems that can be caused by improperly or poorly installed taps; further, the environment in which the tap or coupler exists dictates that the coupler be weatherproofed and be completely impervious to moisture and other elements.

It is therefore an object of the present invention to provide a directional coupler that can readily be attached to a co-axial cable without great attention to the manner of installation, thereby permitting semi-skilled personnel to satisfactorily install the coupler.

It is another object of the present invention to provide a method for connecting a coupler or tap to a co-axial cable wherein the resulting connection is both electrically and mechanically superior.

It is still another object of the present invention to provide a method and apparatus for coupling house drop co-axial cables to a feeder line co-axial cable efficiently and inexpensively.

These and other objects of the present invention will become apparent to those skilled in the art as the description thereof proceeds.

Briefly, in accordance with the embodiment chosen for illustration, a method and apparatus are provided wherein a co-axial cable of a feeder line type is drilled in three locations. The resulting holes are lined longitudinally along the cable and the center hole extends through the outer conductor, through the insulation, and severs the inner conductor. The outer holes penetrate the outer conductor but stop short of severing the inner conductor. Electrical conductors in the form of forked or bifurcated metal clips are forced through the outer holes into gripping engagement with the inner conductor. A guide, formed of insulating material, simultaneously extends into the center hole. The guide is longitudinally split and is provided with a bifurcated spring member which is urged against the walls of the center hole to intimately contact the outer conductor of the co-axial cable. The apparatus of the present invention includes a directional coupler housing having four connectors thereto, each for connection with a house drop cable. The connector for attaching the house drop cable to the coupler includes an internally threaded sleeve adapted to receive an externally threaded hollow insert. The hollow insert is used to compress a gasket sleeve which, by hydraulic flow, exerts pressure against the outer jacket of the house drop cable, thereby forcing the outer conductor against the insert to insure electrical contact therewith. An internally threaded sheath contact permits the "threading" the contact onto the insulation material separating the inner and outer conductor of the house drop cable. The contact is thus forcibly pressed against the outer conductor of the cable and is used to abut the insert sleeve to insure proper grounding contact from the coupler to the cable, while deformation of the gasket provides a weather sealer.

The present invention may more readily be described by reference to the accompanying drawings, in which:

FIG. 1 is a perspective view of a directional coupler constructed in accordance with the teachings of the present invention with a portion removed.

FIG. 2 is a perspective view of the top portion of the apparatus of FIG. 1 including a clamp and a co-axial cable to which the coupler is connected.

Figure 3:
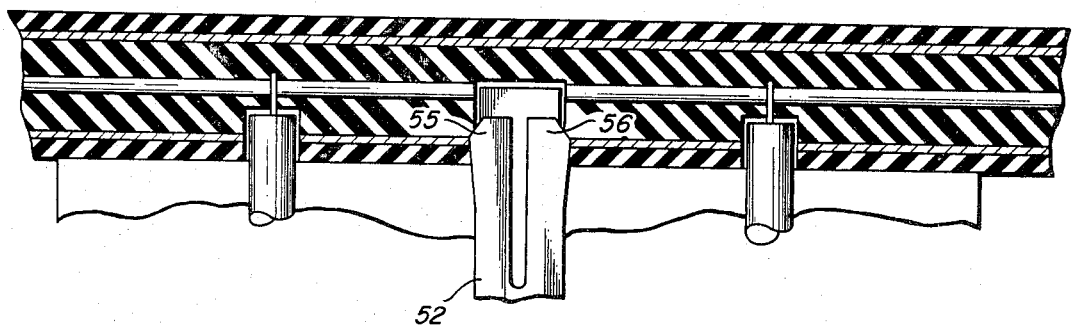
FIG. 3 is a cross-sectional view of a portion of FIG. 2 taken along line 3—3.
Figure 4:
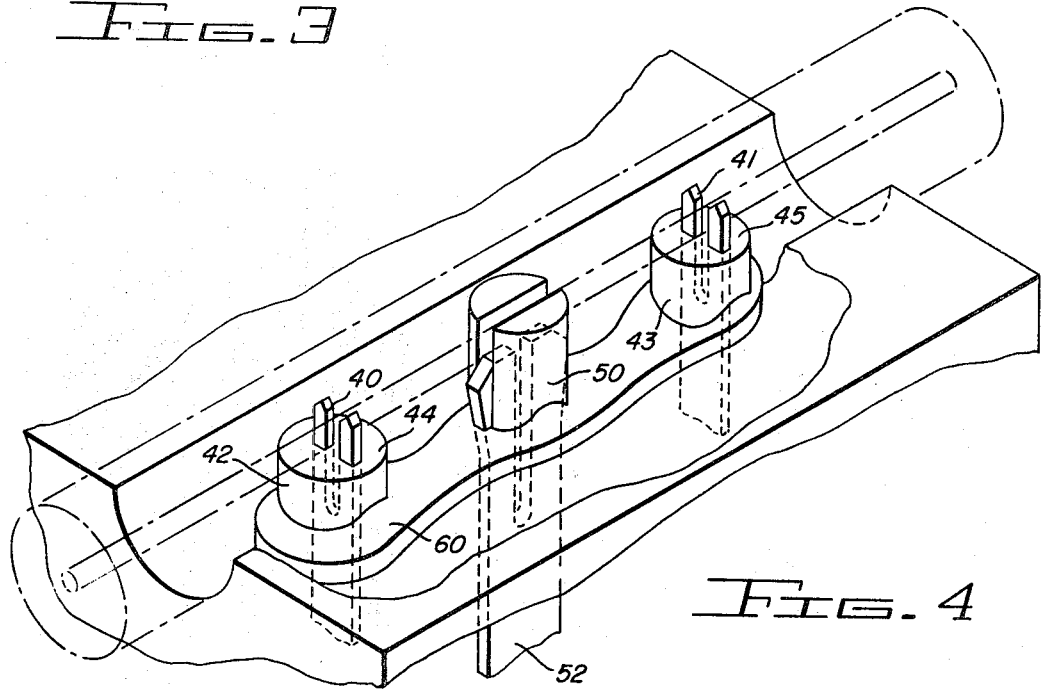
FIG. 4 is a perspective view, partially schematic, of a portions of the apparatus of FIGS. 1 and 2, illustrating details of the coupler.

Referring now to FIGS. 1–4, the co-axial cable of the type utilized in feeder lines of CATV characteristically includes a solid inner conductor 10 of copper co-axially aligned and separated from a solid tubular aluminum conductor 11 by insulating material 12. An insulation sheath 13 surrounds the entire cable. To properly couple a device or another line to a co-axial cable, care must be taken to insure intimate electrical contact with both the inner conductor 10 and the outer conductor 11. This coupling is achieved by the method of the instant invention by drilling a hole inversely oriented to the axis of the cable through the sheath 13, the outer conductor 11, the insulation 12, and the inner conductor 10.

The hole, which in its most convenient form will obviously be cylindrical, must be of sufficient depth to sever the inner conductor 10. Two outer holes longitudinally displaced from the first hole are placed on either side of the first hole; each of the second holes penetrates the sheath 13, the outer conductor 11, and may penetrate a portion of the insulation 12, but does not sever the inner conductor 10. Electrical contact is made to the inner conductor 10 by extending contacts through the outer holes into engagement with the inner conductor. Contact is made with the outer conductor 11 such as by penetrating the sheath 13 with a pointed contact or by contacting the outer conductor 11 where it is exposed by the inner hole. Electrical connection is thus made to the inner conductor and the outer conductor and any external circuitry may be utilized to receive the signal transmitted by the cable, alter or regenerate the signal, and return it to the cable without the difficulties encountered by simple, singular probes. In the event the two outer holes are widely spaced, it may be desirable, to prevent unwanted line reflections, to provide two instead of one inner hole severing the inner conductor, each inner hole being positioned close to its corresponding outer hole. The apparatus of the present invention includes a coupling box 20 which may be utilized to house suitable coupling circuitry and may conveniently be formed of molded plastic material selected to be impervious to the outdoor conditions under which the couplers are required to operate.

The box 20 includes a channel 21 formed therein shaped to receive a co-axial cable 22. A clamp 23 includes extension 24 which interlock with openings 25 provided in a metal frame 26 embedded within the box 20. The frame 26 is also attached to a threaded shaft 30 which extends upwardly and out of the box 20, across the channel 21 from the openings 25 in teh frame 26. The clamp 23 includes an inverted channel portion 31 which is adapted to mate with the channel 21 of the box 20 to permit the cable 22 to be firmly gripped and held in the channel. The gripping force provided by the clamp 23 is carried primarly by the frame 26 to alleviate stresses in the plastic material of the box 20; further, the clamping force available through the utilization of the threaded shaft 30 on the clamp 23 together with deformable seal 60 insures weather-tight sealing of the connections made to the cable 22, to be described more fully hereinafter. The box 20 may conventionally be a directional coupler of the type receiving a suitable TV signal from a CATV feeder line; the coupler normally will provide for the coupling of four house drop lines such as those shown at 34, 35, and 36.

The house drop cables are of different form than the feeder line cables, such as those shown at 22, and will also be described more completely hereinafter, together with a unique connector for electrically connecting the house drop cables to the box 20.

A pair of bifurcated contact 40 and 41 extend upwardly from the box 20 into the channel 21. Each of the contacts 40 and 41 are of sufficient length to extend into the cable 22 and grippingly engage the inner conductor 10 when the cable is placed in position in the channel 21. The contacts 40 and 41 are encased in pedestals 42 and 43 respectively which extend upwardly from the bottom of the channel 21 into the cable and may conveniently be formed integrally with the box 20. The pedestals 42 and 43 perform several functions and may be of such diameter as to closely approximate the diameter of the outside holes in the cable 22 as discussed previously. The pedestals 42 and 43 support and strengthen the contacts 40 and 41 and also act to guide the contacts as the latter are placed into the holes provided therefor in the cable. It may be noted that the contacts 40 and 41 extend out of the tube 44 and 45 respectively of the pedestals which terminate short of the inner conductor 10 when the conductor is lowered into the channel 21.

A third pedestal 50 formed in a similar manner to pedestals 42 and 43 is positioned between the latter to engage the center hole provided in the cable 22. The pedestal 50 is longer than the other pedestals and acts as a guide for positioning the cable 22 when the latter is lowered into the channel 21. The pedestal 50 is longitudinally split to permit a bifurcated contact 52 to extend transversely from the pedestal 50. The contact 52 is shaped so that it extends transversely outwardly from between the two halves of the split pedestal 50; the bifurcation of the contact 52 permits the fingers 55 and 56 thereof to be deflected toward each other as the fingers come into intimate contact with the walls of the center hole in the cable 22. In this manner, firm contact is provided between the contact 52 and the outer conductor 11 of the cable 22. A deformable seal 60 is provided around and between the pedestals 42, 43, and 50 to insure complete weathertight sealing when the clamp 23 forces the cable 22 into the channel 21.

Figure 5:
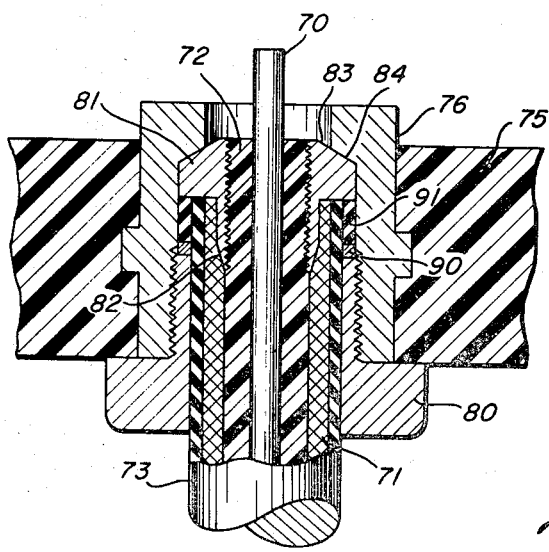
FIG. 5 is a cross-sectional view of a house drop cable connector showing the manner in which the house drop cables are connected to the apparatus of FIG. 1.

The house drop cables such as those shown at 34, 35 and 36 are constructed in a manner shown in FIG. 5. A solid inner conductor 70 of copper is longitudinally aligned with and held displaced from an outer conductor 71 of braided copper by a solid but deformable plastic insulating tube 72. An outer insulating sheath 73 encases the cable. The box 20 includes walls such as shown in FIG. 5 at 75 to which is attached by any suitable means an internally threaded insert sleeve 76. It will be apparent to those skilled in the art that there are many ways in which the sleeve 76 may be attached. An externally threaded hollow insert 80 is provided and threadily engages the insert sleeve. The cable is trimmed such that the inner conductor 70 extends beyond the end of the insulating tube 72 which, in turn, extends beyond the end of the braided outer conductor 71 and insulating sheath 73. An internally threaded sheath contact 81 is then placed over the end of the inner conductor 70 and is threaded onto the exposed insulating tube 72. As mentioned previously, the insulating tube 72 is normally of a solid but deformable plastic material which may readily be deformed by the pressure of the threads existing on the sheath contact. The sheath contact includes a tapered end 82 so that as the contact is threaded onto the insulation tube 72, the braided outer conductor 71 is expanded into intimate contact with the sheath contact 81. The sheath contact 81 and the insert sleeve 76 include abutting surfaces 83 and 84 respectively which form solid electrical contact therebetween.

A washer 90 abuts a deformable gasket 91 such that when the hollow insert 80 is firmly threaded into the insert sleeve 76, the washer 90 compresses the gasket 91, deforming the latter and providing a hermetic seal. The deformation or hydraulic flow of the gasket 91 applies inward radial pressure on the sheath 73 and outer braided conductor 71, forcing them into intimate contact with the sheath contact 81. The threaded connection between the sheath contact 81 and the insulating tube 72 also provides a moisture seal prohibiting the entrance of moisture into the interior of the box 20 by reason of any moisture that may be contained between the sheath 73 and the insulation material 72.

It will be obvious to those skilled in the art that many modifications may be made in the specific embodiments described in the foregoing description without departing from the spirit and scope of the invention. It will also be obvious to those skilled in the art that suitable electronic equipment will be contained within the directional coupler box 20 and is appropriately connected to the inner and outer conductors of the co-axial cables attached thereto. The form of the electronic equipment contained within the coupler is not a part of the present invention and therefore need not be described.

I claim:

1. In a co-axial cable system utilizing co-axial cables having an inner and outer conductor separated from each other, the method of making electrical connection therewith comprising: forming an opening in said co-axial cable extending through said outer conductor and severing said inner conductor; forming contact holes longitudinally displaced on either side of said opening, said holes penetrating said outer conductor and terminating short of severing said inner conductor; and extending conductors into said holes and into contact with said inner conductor.

2. The method set forth in claim 1, including the step of extending a conductor into said opening and into contact with said outer conductor simultaneously with extending conductors into said holes.

3. The combination set forth in claim 1, wherein said co-axial cable is provided with a solid insulating material separating said inner and outer conductors and wherein said opening extends through said outer conductor and through said insulation material to sever said inner conductor.

4. Apparatus for coupling to a co-axial cable having an inner and an outer conductor separated by insulation material, said cable also having an opening extending through said outer conductor, through said insulation material and severing said inner conductor, and having a pair of contact holes longitudinally displaced on either side of said opening, said holes penetrating said outer conductor and terminating short of severing said inner conductor, said apparatus comprising: a coupling box having a channel shaped to receive said co-axial cable; a clamp removably attached to said box over said channel for contacting said cable and forcing said cable into said channel; a pair of contacts extending from said box into said channel longitudinally spaced from each other for extending into said contact holes, said contacts of sufficient length to extend into contact with said inner conductor when said cable is placed in said channel; and means extending from said box into said channel for contacting said outer conductor and making electrical contact therewith.

5. The combination set forth in claim 4, wherein said pair of contacts are encased in pedestals of insulating material with the contacts extending out of the tube of said pedestals whereby said pedestals insulate, strengthen, and guide said contacts when the latter extend into said holes.

6. The combination set forth in claim 4, wherein said contacts are bifurcated to thereby grippingly engage said inner conductor.

7. The combination set forth in claim 4, wherein said means extending from said box comprises a conductor positioned to extend into said opening, said conductor spring-biased against the walls of said opening to provide an electrical contact with said outer conductor.

8. The combination set forth in claim 5, wherein said contacts are bifurcated to thereby grippingly engage said inner conductor.

9. The combination set forth in claim 7, including a third pedestal for extending into said opening and wherein said spring-biased conductor extends outwardly from said third pedestal.

10. The combination set forth in claim 8, wherein said means extending from said box comprises a conductor positioned to extend into said opening, said conductor spring-biased against the walls of said opening to provide an electrical contact with said outer conductor.

References Cited

UNITED STATES PATENTS

| 2,615,948 | 10/1952 | Kamen | 333—8 XR |
| 2,694,183 | 11/1954 | Edlen et al. | 333—6 |
| 2,723,327 | 11/1955 | Gilbert | 200—168 |
| 2,745,065 | 5/1956 | Maher | 333—6 |

MARVIN A. CHAMPION, Primary Examiner

L. J. STAAB, Assistant Examiner

U.S. Cl. X.R.

174—71; 333—6; 339—177